UNITED STATES PATENT OFFICE.

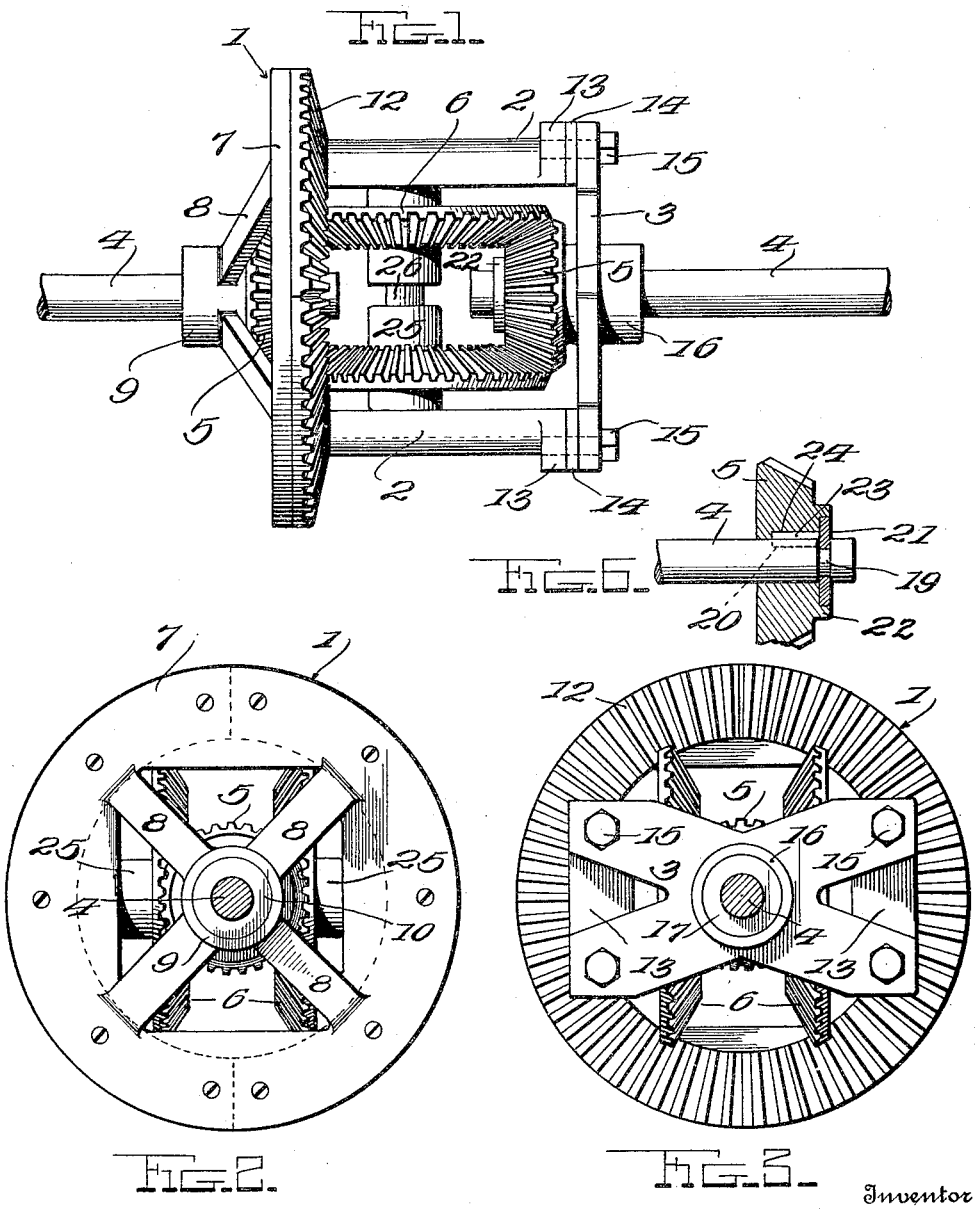

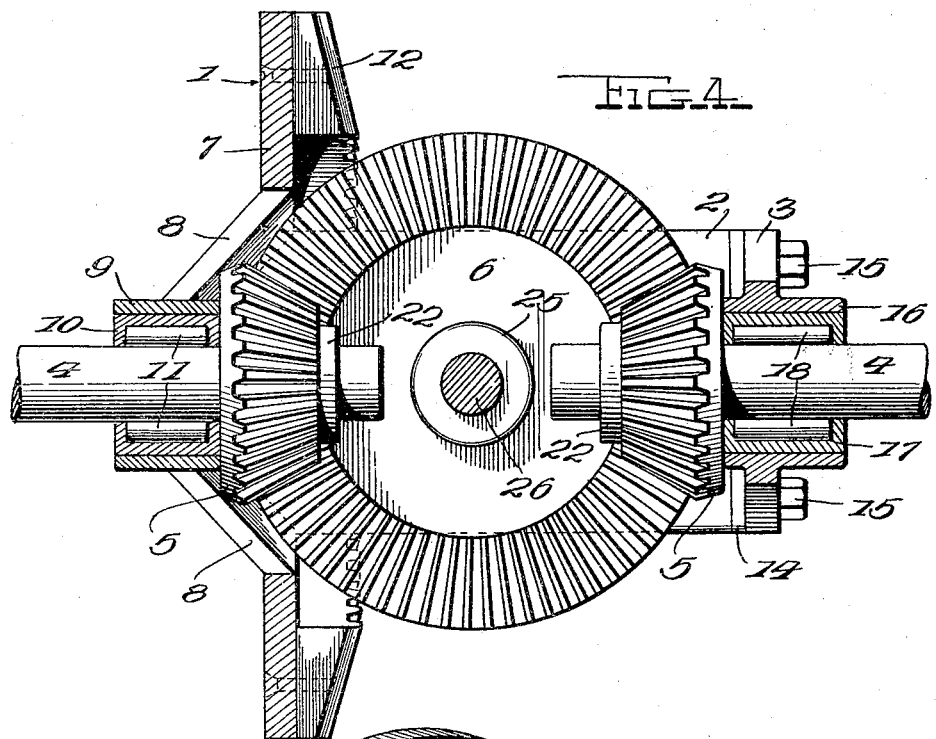
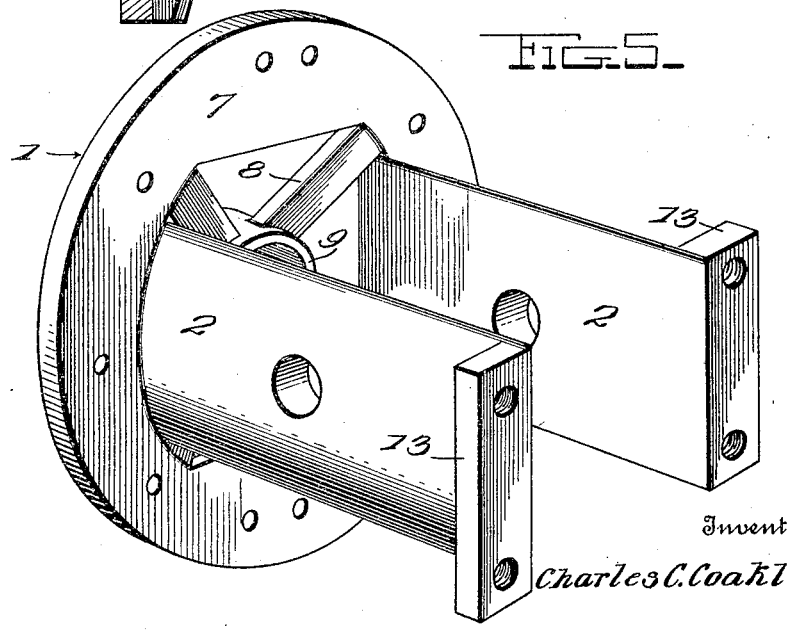

CHARLES C. COAKLEY, OF CANTON, NEW YORK.

DIFFERENTIAL GEARING FOR AUTOMOBILES.

1,121,803.

Specification of Letters Patent.

Patented Dec. 22, 1914.

Application filed February 26, 1914. Serial No. 821,187.

*To all whom it may concern:*

Be it known that I, CHARLES C. COAKLEY, a citizen of the United States, residing at Canton, in the county of St. Lawrence and State of New York, have invented certain new and useful Improvements in Differential Gearing for Automobiles; and I do declare the following to be a full, clear, and exact description of the invention, such as will enable others skilled in the art to which it appertains to make and use the same.

This invention relates to improvements in differential gearing for automobiles and the main object of the invention is to provide a simply constructed gear of the character described which will efficiently perform the work for which it is designed.

With the above and other minor objects in view, the invention resides in certain novel features of construction and combination herein described and claimed and shown in the drawings wherein:

Figure 1 is a plan view of my improved differential gearing; Fig. 2 is an end view of one end of the gearing; Fig. 3 is an end view looking from the opposite end thereof; Fig. 4 is a longitudinal section of the device. Fig. 5 is a perspective view of the power ring and its arms with the gear teeth removed therefrom; and Fig. 6 is a detail section view through the inner end of one of the axle sections showing the manner in which the bevel pinions are secured thereon.

In the accompanying drawings, I have shown my improved differential gearing as comprising a power wheel 1, arms 2 projecting laterally therefrom, a plate 3 connecting the free ends of said arms, axle sections 4, bevel pinions 5 thereon, and bevel gears 6 revolubly mounted between the arms 2 and in mesh with said pinions 5.

The power wheel 1 is shown in the form of an annular ring 7 having a plurality of radially extending arms 8 which also extend slightly outward from said ring and carry a boss 9 in which is secured an outer race 10 of a roller bearing, the rollers 11 of which are confined within said race and bear normally against one of the axle sections 4 which is thereby revolubly mounted in said bearing. Any suitable means of transmitting power may be secured to the ring 7, but I preferably employ a gear ring 12 which is formed in a number of sections (preferably two) and is secured to said ring 1 by screws or other suitable fastening devices.

The arms 2 are cast integrally with the ring 7 and, as above stated, project laterally therefrom. The outer ends of these arms are provided with outwardly turned flanges 13 through which and spacing plates 14, as well as the outer ends of the plate 3, headed screws 15 are passed for the purpose of rigidly securing said plate to said arms. The plate 3 is provided with a central boss 16 in which a race 17 of a roller bearing is rigidly secured, the rollers 18 of said bearing here contacting with the periphery of the other axle section 4 which is thereby revolubly mounted.

Each axle section 4 is formed near its inner end with a peripheral groove 19 and with a longitudinal groove or key way 20. The groove 19 is provided for the reception of the inner edge of a split ring 21 which is held in position in said groove by an annular flange 22 which extends laterally from the inner end of each pinion 5. When the flanges 22 are in position relative to the split rings 21, a key 23 seats within the key way 20 in the axle section 4 and in a similar key way 24 formed in the bore of each pinion 5. By this construction, it will be readily seen that the pinions 5 are rigidly held in proper position on the axle sections 4 and that a slight inward movement of said sections is allowed by this mounting, this compensating for various inward and outward movements of the sections 4 without wedging the pinions 5 between the gears 6. This I consider a very important feature of my invention.

The gears 6 have their hubs 25 revolubly mounted on a transverse shaft 26 which is rigidly mounted in the arms 2. By providing the arms 2, I am enabled to employ gears 6 of considerably larger diameter than those usually employed in devices of this character. Thus it will be seen that in making a turn, the gears 6 will revolve only a part of a revolution, this being due to the fact that said gears are provided with more teeth than the pinions 5, driving said gears. This is a marked improvement over the ordinary construction employing large gears on the axle sections and pinions on the driving gear, since, by the last named construction, the pinions are caused to rotate several times, upon their bearings, in making a turn, whereas, with the construction illustrated in the accompanying drawings, since the gears 6 will merely revolve a part of a revolution, excessive wear on the shaft 26 and on the hubs of said gears, is obviated.

It is a well-known fact that even with the best constructed motor cars, the sections of the driving axle are prone to shift slightly inward and outward and that this movement is prone to force the various gears of the differential gearing into forcible contact. By providing the connection above described, between the axle section 4 and the pinions 5, however, this difficulty is overcome and any slight inward and outward movement on the part of the axle sections is compensated for, yet outward movement is limited by the split ring 21, thus preventing the axle sections 4 from entirely disengaging the pinions 5 which might otherwise occur on account of the fact that the keys 23 could readily be removed from their keyways 20, were it not for said split rings.

Although my differential gearing is primarily designed for use between the two sections of a driving axle of a motor car, it will be understood that it could be used to equal advantage between the two sections of a differential shaft from which power is transmitted to the rear wheels of the vehicle in any suitable manner.

From the foregoing description, taken in connection with the accompanying drawings, the construction and operation of the invention will be readily understood without requiring a more extended explanation.

Various changes in minor details may be resorted to without departing from the spirit of the invention as claimed.

Having thus described my invention, what I claim as new and desire to secure by Letters-Patent is:

1. Differential gearing comprising a driving ring having parallel arms projecting laterally therefrom and having outturned flanges, said ring likewise having radial arms provided with a bearing located at the center of the ring, a plate secured at its opposite ends to said flanges and having a bearing at its center alined with the bearing carried by said radial arms, shafts passing revolubly through said bearings, pinions on the inner ends of said shafts, a transverse shaft having its opposite ends secured in said laterally projecting arms, and beveled gears revolubly mounted on said transverse shaft and in mesh with said pinions.

2. A device of the character described, comprising a one-piece driving gear ring formed on one side with an annular series of teeth and with two integral arms projecting from diametrically opposite points on the inner edge of the ring and arranged parallel to each other and the longitudinal axis of the ring, said arms terminating in right angularly disposed flanges projecting outwardly and having between their ends oppositely arranged shaft bearings, the other side of said ring being formed with integral inwardly converging arms united integrally with a tubular bearing arranged concentrically with the longitudinal axis of the ring, a plate removably secured to said flanges and having a centrally arranged bearing, axially alined shafts in said bearings, pinions on the inner ends of the latter, a transverse shaft in the bearings in said arms, and opposing gears on said transverse shaft and meshing with said pinions.

3. Differential gearing comprising a drive wheel, a bevel gear carried thereby and mounted to revolve on an axis at right angles to the axis thereof, alined bearings carried by said wheel, shaft sections revolubly mounted in said bearings, each of said sections having a peripheral groove in its inner end and a longitudinal keyway registering therewith, pinions meshing with said gear and slidably mounted upon said shaft sections, said pinions having keyways registering with the keyways in said shaft sections and having annular flanges formed on their inner ends encircling said peripheral grooves, keys in the registering keyways of the shaft sections and pinions, and split rings in said peripheral grooves and retained within said annular flanges.

4. Differential gearing comprising a drive wheel, a bevel gear carried thereby and mounted to revolve on an axis at right angles to the axis thereof, alined bearings carried by sad wheel, shaft sections revolubly mounted in said bearings, bevel gears slidably keyed upon the inner ends of said shaft sections and meshing with said gear and stops on said inner ends whereby the outward movement of said shaft sections is limited.

In testimony whereof I have hereunto set my hand in presence of two subscribing witnesses.

CHARLES C. COAKLEY.

Witnesses:
THERON PLACE,
FRANK J. CARPENTER.